US009671953B2

(12) United States Patent
Wang et al.

(10) Patent No.: US 9,671,953 B2
(45) Date of Patent: Jun. 6, 2017

(54) SYSTEMS AND METHODS USING DRAWINGS WHICH INCORPORATE BIOMETRIC DATA AS SECURITY INFORMATION

(71) Applicant: U.S. Army Research Laboratory ATTN: RDRL-LOC-I, Adelphi, MD (US)

(72) Inventors: Cliff Xiaogang Wang, Cary, NC (US); Wesley E. Snyder, Raleigh, NC (US); Benjamin S. Riggan, Cary, NC (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 53 days.

(21) Appl. No.: 14/192,164

(22) Filed: Feb. 27, 2014

(65) Prior Publication Data

US 2014/0250522 A1 Sep. 4, 2014

Related U.S. Application Data

(60) Provisional application No. 61/772,491, filed on Mar. 4, 2013.

(51) Int. Cl.
*G06F 21/00* (2013.01)
*G06F 3/0488* (2013.01)
*G06F 21/36* (2013.01)

(52) U.S. Cl.
CPC .......... *G06F 3/04883* (2013.01); *G06F 21/36* (2013.01)

(58) Field of Classification Search
CPC ...... G06F 21/31; G06F 21/36; G06F 3/04883; H04L 9/32; H04L 29/06; H04L 63/08
See application file for complete search history.

(56) References Cited

U.S. PATENT DOCUMENTS 3,069,654 A    12/1962  Hough
5,828,772 A *  10/1998  Kashi ................... G07C 9/0015
                                                              382/119
8,024,775 B2    9/2011  Xu et al.
(Continued)

FOREIGN PATENT DOCUMENTS

CN         104239761       * 12/2014
WO      WO 2007/146437     * 10/2008
WO         2012046099       4/2012

OTHER PUBLICATIONS

Do, Chuong, "The Multivariate Gaussian Distribution", Oct. 10, 2008, http://cs229.stanford.edu/section/gaussians.pdf.*
(Continued)

*Primary Examiner* — Chau Le
*Assistant Examiner* — Muhammad Chaudhry
(74) *Attorney, Agent, or Firm* — Eric Brett Compton

(57) ABSTRACT

Systems and methods using drawings as security information are disclosed. According to an aspect, a computing device may include a touchscreen display configured to receive information for drawing a security picture. Further, the computing device may include a security manager configured to determine one or more characteristics associated with input of the gesture information. The security manager may also be configured to authenticate a user based on the drawn security picture and the one or more characteristics associated with input of the gesture information.

21 Claims, 13 Drawing Sheets

(56) References Cited

U.S. PATENT DOCUMENTS

| | | | |
|---|---|---|---|
| 8,352,745 B2 | 1/2013 | McKeeth | |
| 8,615,793 B2* | 12/2013 | Theimer | G06F 21/46 382/195 |
| 8,695,086 B2* | 4/2014 | Davis | G06F 21/316 713/186 |
| 2003/0035569 A1* | 2/2003 | Chau | G06K 9/00087 382/124 |
| 2003/0182585 A1* | 9/2003 | Murase | G06F 21/32 726/3 |
| 2005/0207653 A1* | 9/2005 | Nikitin | G06K 9/00154 382/202 |
| 2008/0092245 A1* | 4/2008 | Alward | G06F 21/316 726/28 |
| 2008/0235788 A1* | 9/2008 | El Saddik | G06F 21/36 726/18 |
| 2009/0232361 A1* | 9/2009 | Miller | G06K 9/6293 382/115 |
| 2009/0303188 A1* | 12/2009 | Triplett | G06F 3/04847 345/173 |
| 2010/0111370 A1* | 5/2010 | Black | G06K 9/00369 382/111 |
| 2011/0231666 A1* | 9/2011 | Guenther | G06F 21/32 713/186 |
| 2011/0274319 A1* | 11/2011 | Su | A61B 5/117 382/117 |
| 2012/0274583 A1* | 11/2012 | Haggerty | G06F 3/0488 345/173 |
| 2013/0111580 A1* | 5/2013 | Checco | G06K 9/00167 726/19 |
| 2013/0219490 A1* | 8/2013 | Isbister | G06F 21/32 726/19 |
| 2013/0273968 A1* | 10/2013 | Rhoads | G06F 17/30244 455/556.1 |
| 2014/0003675 A1* | 1/2014 | Li | G06F 21/32 382/123 |
| 2014/0006940 A1* | 1/2014 | Li | G06F 3/0483 715/268 |
| 2014/0362003 A1* | 12/2014 | Kimn | G06F 3/041 345/173 |

OTHER PUBLICATIONS

Skrbek, Miroslav. "Signature Dynamics on a Mobile Electronic Signature Platform." GI Jahrestagung (Schwerpunkt "Sicherheit-Schutz und Zuverlässigkeit"). 2003.*

Mendaza-Ormaza, Aitor, et al. "Analysis of handwritten signature performances using mobile devices." Security Technology (ICCST), 2011 IEEE International Carnahan Conference on. IEEE, 2011.*

Impedovo, Donato, Giuseppe Pirlo, and Rejean Plamondon. "Handwritten signature verification: New advancements and open issues." Frontiers in Handwriting Recognition (ICFHR), 2012 International Conference on. IEEE, 2012.*

Sun, Jingchao, et al. "Touchin: Sightless two-factor authentication on multi-touch mobile devices.", Retrieved from http://ieeexplore.ieee.org/stamp/stamp.jsp?arnumber=6997513 , Communications and Network Security (CNS), 2014 IEEE Conference on. IEEE, 2014.*

Sherman, Michael, et al. "User-generated free-form gestures for authentication: Security and memorability.", Retrieved from http://dl.acm.org/citation.cfm?id=2594375 , Proceedings of the 12th annual international conference on Mobile systems, applications, and services. ACM, 2014.*

Sadegh Abbasi. Squid database. Available at: http://www.ee.surrey.ac.uk/CVSSP/demos/css/demo.html. 1996.

D.H Ballard. Generalizing the Hough Transform to Detect Arbitrary Shapes. Pattern Recognition. 13(2):111 122, 1981.

S. Belongie and J. Malik. Matching with Shape Context. In IEEE Workshop on Content-based Access of Image and Video Libraries (CBAIVL 2000). 2000.

S. Belongie. J. Malik, and J. Puzicha. Shape Matching and Object Recognition Using Shape Contexts. In Technical Report UCB//CSDOO—1128. UC Berkeley, Jan. 2001.

S. Belongie, J . Malik, and J. Puzicha. Shape Matching and Object Recognition Using Shape Contexts. IEEE PAMI, 24(4), Apr. 2002.

P. Chung, E. Chen, and J. Wu. A Spatiotemporal Neural Network for Recognizing Partially Occluded Objects. IEEE Transactions on Signal Processing, 46(6), Jul. 1998.

David Coeurjolly, Serge Miguet,. and Laure Tougne. Discrete Curvature Based on Osculating Circle Estimation. Lecture Notes in Computer Science, 2059:303, 2001.

David Coeurjolly and Stina Svensson. Estimation of Curvature Along Curves with Application to Fibres in 3D images of paper. Lecture Notes in Computer Science, 2749:247 254, 2003.

I. Debled-Rennesson, J.P. Reveilles. A Linear Algorithm for Segmentation of Digital Curves. International Journal of Pattern Recognition and Artificial Intelligence, 9(4):635 662, 1995.

M. Fukumi. S. Omatu. and Y. Nishikawa. Rotation-Invariant Neural Pattern Recognition System Estimating a Rotation Angle. Neural Networks. IEEE Transactions on, 8(3), May 1997.

M. Hu. Visual pattern Recognition by Moment Invariants. IRE Transactions on Information Theory, 8, 1962.

Picture Password Lockscreen. Available at: https://play.google.com/store/apps/details?id=com.TwinBlade.PicturePassword. (c)2014. Google.

J. Kim, S. Yoon, and K. Sohn. A Robust Boundary-Based Object Recognition in Occlusion Environment by Hybrid Hopfield Neural Networks. Pattern Recognition, 29(12), Dec. 1996.

J. Kim, J. Choi, J. Yi, and M. Turk. Effective Representation Using ICA for Face Recognition Robust to Local Distortion and Partial Occlusion. IEEE Transactions PAMI. 27(12). Dec. 2005.

W. E. Snyder. A strategy for shape recognition. In A. Srivastava, editor,Workshop on Challenges and Opportunities in Image Understanding, College Park, MD, Jan. 2007. (Wesley Snyder & Karthik Krish, slide presentation titled "A Biologically-Plausable Approach to Shape Representation and Recognition").

Karthik Krish, Wesley E. Snyder: A New Accumulator-Based Approach to Shape Recognition. ISVC (2) 2008: 157-169.

David G. Kendall, "A Survey of the Statistical Theory of Shape," Statistical Science, vol. 4, No. 2, 87-120 (1989).

Gregory Dudek and John K. Tsotsos, "Shape Representation and Recognition from Multiscale Curvature," Computer Vision and Image Understanding, vol. 68, No. 2, November, pp. 170-189, 1997.

Mikael Rousson and Daniel Cremers, Efficient Kernel Density Estimation of Shape and Intensity Priors for Level Set Segmentation, G. Gerig (Ed.), Medical Image Comput. and Comp.—Ass. Interv. (MICCAI), Palm Springs, Oct. 2005. LNCS vol. 3750, pp. 757-764.

* cited by examiner

FIG. 14

SYSTEMS AND METHODS USING DRAWINGS WHICH INCORPORATE BIOMETRIC DATA AS SECURITY INFORMATION

CROSS REFERENCE TO RELATED APPLICATION(S)

The present application claims the benefit of U.S. Provisional Patent Application No. 61/772,491 filed Mar. 4, 2013, herein incorporated by reference in its entirety, for all purposes.

GOVERNMENT INTEREST

Funding underlying this invention came at least in part from Contract No. W911NF-04-D-0003. The invention described herein may be manufactured, used and licensed by or for the U.S. Government without the payment of royalties thereon.

TECHNICAL FIELD

The present disclosure relates to computing device security. More particularly, the present disclosure relates to systems and methods using drawings which incorporate biometric data as security information.

BACKGROUND

Traditional computing devices permit access to secured content by use of a login name and password. Each user may be assigned a unique login name. The password may be a secret word or string of characters that is used for user authentication, or for access approval to gain access to a resource. The password should be kept secret from those not allowed access. Although individuals make efforts to keep passwords secret, sometimes passwords can be stolen or correctly guessed by other individuals who are not authorized to access a computing device. Further, users may be required to change their passwords every three months to a year. These passwords may be required to contain, for example, uppercase, lowercase, letters, numbers, and symbols. The complexity of this process may force the user to write his or her password down, resulting in a security risk.

For at least these reasons, it is described to provide improved techniques for securing content on computing devices and for allowing users to provide their identity for accessing secured content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods using drawings as security information are disclosed. According to an aspect, a computing device may include a touchscreen display configured to receive gesture information for drawing a security picture. Alternatively, the security picture may be entered by use of a pen-based computing tablet. Further, the computing device may include a security manager configured to determine one or more characteristics associated with input of the gesture information. The security manager may also be configured to authenticate a user based on the drawn security picture and the one or more characteristics associated with input of the gesture information.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 3 shows images of two faces, face 2 on the left, face 4 on the right which are identified by the algorithm as different but similar.

FIG. 14 illustrates a set of three training sketches input to the system which constitute the model.

DETAILED DESCRIPTION

Figure 1:
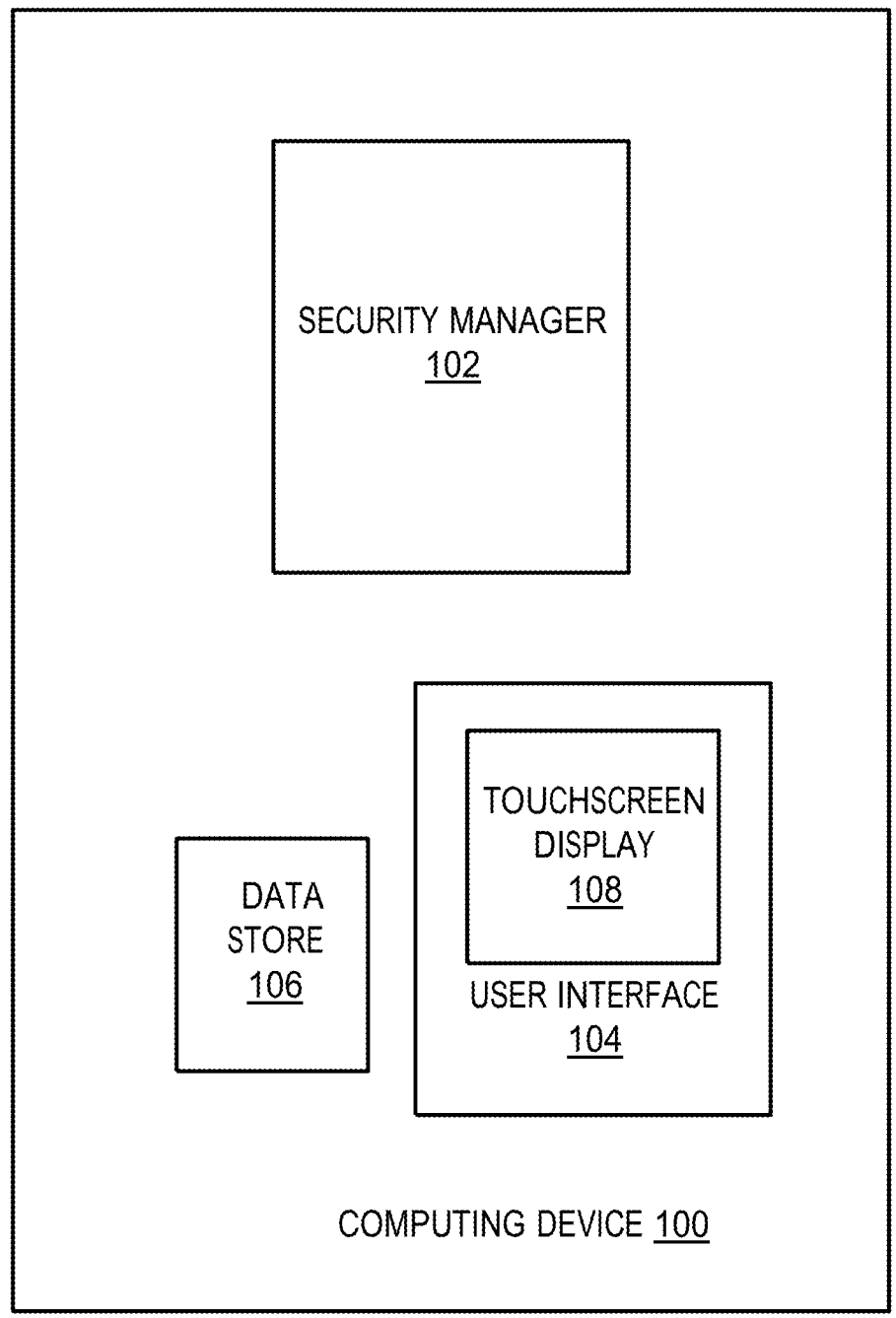
FIG. 1 is a block diagram of a computing device 100 configured to use touchscreen drawings as security information in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of mobile device, for example, a smart phone, a cell phone, a pager, a personal digital assistant (PDA, e.g., with GPRS NIC), a mobile computer with a smart phone client, a television, a wireless communication-enabled photo frame, or the like. A computing device can also include any type of conventional computer, for example, a desktop computer or a laptop computer. A typical mobile device is a wireless data access-enabled device (e.g., an iPHONE® smart phone, a BLACK-BERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks, or other client applications. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, an "interface" is generally a system by which users interact with a computing device. An interface can include an input for allowing users to manipulate a computing device, and can include an output for allowing the system to present information and/or data, indicate the effects of the user's manipulation, etc. An example of an interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display may be a touch-screen display capable of displaying text and graphics. In addition, the touchscreen display may be capable of receiving touch inputs from a user. For example, a user can control through simple or multi-touch gestures by touching the screen with one or more fingers.

The presently disclosed subject matter provides a way for users to draw or sketch a shape or other design that can be used to authenticate the user for providing access to secure content on a computing device. Such a drawing or sketch can be easily remembered by a user. The computing device can store information about not only the appearance of the sketch or drawings but also how the sketch or drawing was drawn for use in authenticating a user. In this way, it is very particular to a user and difficult for others to enter fraudulently.

FIG. 1 illustrates a block diagram of a computing device 100 configured to use touchscreen drawings as security information in accordance with embodiments of the present disclosure. Alternatively, drawings may be entered by touch or by use of an electronic pen. Referring to FIG. 1, the computing device 100 includes a security manager 102, a user interface 104, and a data store 106. The data store 106 may be any suitable memory. The user interface 104 may include a touchscreen display 108, which is configured to receive gesture information for drawing a security picture. For example, the user of the computing device 100 may move one or more fingers across an input surface of the touchscreen display 108 for drawing a security picture. Example security pictures include, but are not limited to, handdrawn shapes, characters, or curves.

The security manager 102 may be implemented by hardware, software, firmware, the like, or combinations thereof. For example, the security manager 102 may be an application or program residing with the data store 106 and implemented by one or more processors. The security manager 102 may be configured to determine one or more characteristics associated with input of gesture information for drawing a security picture. Further, the security manager 102 may authenticate a user based on the drawn security picture and the characteristic(s). For example, the security manager 102 may compare how closely the drawn picture matches a known picture entered by the user. Further, for example, the security manager 102 may compare how closely the characteristics associated with input of the gesture information match known characteristics of the user gesturing to draw the picture.

In accordance with embodiments, "SAM" is an acronym for "Sketch Acquisition Module" and refers to an algorithm or hardware which allows a user to log in by drawing a password on a tablet or other graphical device. The met hod uses SKS, a two dimensional shape recognition algorithm based on an evidence accumulation philosophy reminiscent of the generalized Hough Transform. The curves are not necessarily closed curves and do not have to be drawn, but may also be edges extracted from an image. If resulting from an image, related information such as texture, color, and shading, is ignored. Performance of the algorithm is evaluated under scale (zoom), rotation in the plane, translation and partial occlusion. Here, we evaluate the SKS algorithm, a general shape recognition strategy, for the specific task of curve recognition, especially under occlusion. A few other papers have addressed occlusion of faces, but not addressed the specific question of this paper. Although SKS is utilized in the examples herein, the present disclosure is not limited to SKS but can utilize any shape-based algorithm which includes biometrics.

Notation

One may assume a curve in the plane to be either continuous, and parameterized (typically) by arc length, or discrete, and parameterized by an index, say i. If the continuous representation is used, in order to perform computation, one must eventually use discretization. Therefore, we avoid the integral representation and go directly to the discrete representation. Our objective is to compare two curves, $^iC$ and $^jC$. (We use the superscript on the left to denote which curve is being referred to.) In the discrete form, a curve, say curve i, is an ordered set of points in the plane, $^iC=\{^iC_1; ^iC_2, \ldots, ^iC_N\}$, where $^iC_k=[^ix_k; ^iy_k]^T$, using the usual 2-vector notation for points in the plane. For convenience, it is assumed that each curve has N points in its perimeter unless otherwise explicitly mentioned.

SKS Algorithm

This patent disclosure is for the concept of using sketch matching combined with biometric information for access control. In this section, one shape-matching method which easily incorporates biometrics, SKS, is described. However, other algorithms for shape matching could potentially be used.

The SKS algorithm is a robust 2-d shape recognition algorithm which uses the philosophy of evidence accumulation, as does the Hough transform, and resembling in some aspects the Shape Context. Such an approach uses considerable memory but performs most computations using simple arithmetic and look up. The algorithm is invariant to translation, rotation, and scale and is robust against partial occlusion. The algorithm is also highly parallel in nature which favors neural implementations.

Figure 2:
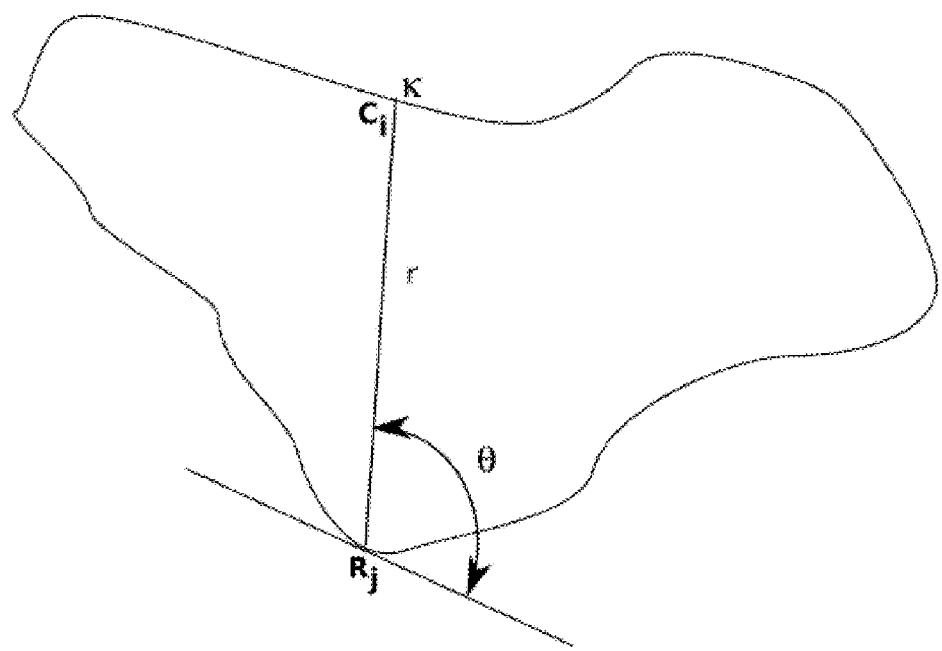
FIG. 2 is a diagram showing feature vectors, κ, curvature at the point, θ, angle between the vector from the reference point to the feature point and the tangent frame of the reference point, ρ, the distance between the reference point and the feature point (all are translation and rotation invariant).

The algorithm is based on vectors of geometric features. FIG. 2 shows an example feature vector calculation. As seen from the figure, each point $^iC_k$ is characterized with respect to the frame at the reference point $^iR$.

Initially, the formalism allows the possibility of a collection of reference points, $\{R_j\}$, which is convenient if partial occlusion can happen. If partial occlusion is impossible, as is the case in sketch passwords, only one reference point is needed, and no subscript on R is needed. The choice of reference point is arbitrary, however, if the reference point is constrained to be one of the points on the curve ($^iR\in{^iC}$), the complexity of the accumulator is greatly reduced.

Example features of point $^iC_k$, as shown in FIG. 2, may include the distance to the reference point, the polar coordinates ($\rho$, $\theta$), $\theta\in(0, 2\Pi)$ of the point with respect to the reference ($^iR$), and the curvature ($\kappa$) at that point.

Invariance

Translation invariance is achieved automatically since only the relative distance between points is considered.

Rotation invariance occurs because curvature is invariant to rotation, and $\ominus$ is defined in the frame defined by the curve, and rotates with the curve.

Scale invariance can be achieved by normalizing with respect to scale, but scale may also be estimated. In the absence of occlusion, scale may be estimated by something as simple as the length of the curve. However, if partial occlusion can occur, more sophisticated methods may be required. The feature vectors may be normalized for scale using the example procedure described in the "Scale Estimation" section below.

All three feature vectors are invariant to rotation. In experiments, all three of these features are used, however, experiments have been conducted using just two, and good results have been achieved. Empirical observation indicated that longer feature vectors improve marginally if at all, but dramatically increased computational complexity; a result consistent with the well-known "curse of dimensionality."

Model Building

Consider an edge image $^iC=\{^iC_1, ^iC_2, \ldots ^iC_N\}$ with N points. A first step in the model building process is to pick a reference point on the contour ($^iR$, $^iR\in{^iC}$, This work uses point of high curvature as the reference points, although other choices, such as inflection points, are possible. Curvature may be determined using Digital Straight Segments (DSS), which can be more reliable and accurate when compared to other techniques.

At the reference point ($^iR$), on the shape, the Frenet Frame (the tangent and the normal at that point) establishes a rotationally invariant reference coordinate system with respect to all the other points on the contour. A model is built with respect to each of these reference points.

Define the feature vector at an arbitrary point $^iC_j$ with respect to the reference point $^iR$ by:

$$v_j=(\rho_j, \theta_j, \kappa_j) \quad (1)$$

To understand this representation, consider a simple version, which considers only the distance from the point on the curve C and the reference point R, and uses scalar values. Then, this simpler model can be written: (equation 2)

$$M(\rho, \kappa) = \sum_j \exp\left(-\frac{(\rho-\rho_j)^2}{2\sigma_\rho^2}\right)\exp\left(-\frac{(\kappa-\kappa_j)}{2\sigma_\kappa^2}\right)$$

where $\rho_j$ is the distance from $C_j$, and similarly, $\kappa_j$ is the curvature at $C_j$. This representation (using a summation) defines the model $M(\rho, \kappa)$ as a measure of the likelihood that a random point along the curve has curvature $\kappa$ and is a distance $\rho$ from the reference. A more general form for the model for a curve with respect to the reference point R may be written in terms of a vector of features v, not including $\rho$ by: (equation 3)

$$M(\rho, \kappa) = \sum_j \exp\left(-\frac{(\rho-\rho_j)^2}{2\sigma_\rho^2}\right)\exp(-(v-v_j)^T K^{-1}(v-v_j))$$

where K is a diagonal matrix of feature variances or by the same equation using a maximum operator instead of a summation.

The form of v given in equation 1 may be used, or a more general form, including pressure and velocity, or other point sketch features or biometric features. In equation 2, the equations have included the term including $\rho$, the distance to the reference, in the vector v, and derived a simpler form. However, it was chosen to make the presence of $\rho$ as a measurement explicit because the model matching will treat this in a special way.

While Equation 3 represents the likelihood to finding a point on the curve with properties ($\rho$, v), Using maximum instead of sum represents the likelihood of finding at least one point with those values. It has been found experimentally that the form using the maximum provides higher discriminability between shapes.

The model function ($^iM(v)$) can be viewed as a function which estimates the presence of a feature (v) in the model. The choice of a Gaussian-like function to represent the likelihood also allows a straight-forward interpretation in probabilistic terms. The model function can be precomputed and stored as a look up table which can considerably speed up the matching process.

Matching

In the SAM application, partial occlusion cannot occur, so for here on, there is only one reference point. The matching process can use evidence accumulation to determine the similarity between two shapes. Consider matching curve $^1C$ which does not have a defined reference point to database model ($^2M(v)$) built from curve $^2C$ using reference point R.

To quantify the quality of the match between two curves, $^1C$ and $^2C$, use $$^{12}A(x) = \frac{1}{L}\sum_{l=1}^{L} {^2M}(\|^1C_l - x\|, v_l) \quad (6)$$

In Equation 6, the algorithm is trying to find the reference point relative to the model. If the image drawn in the same as the model, the accumulator, A, can have a large value at the point in image 2 which corresponds to the reference point of the model. The variable x ranges over potentially all of the points in the image. If, however, prior information is available about where the reference point could be (e.g., the reference must be on the curve), the search can be greatly restricted. The sum over l is a sum over the L points on the test curve.

Figure 8:
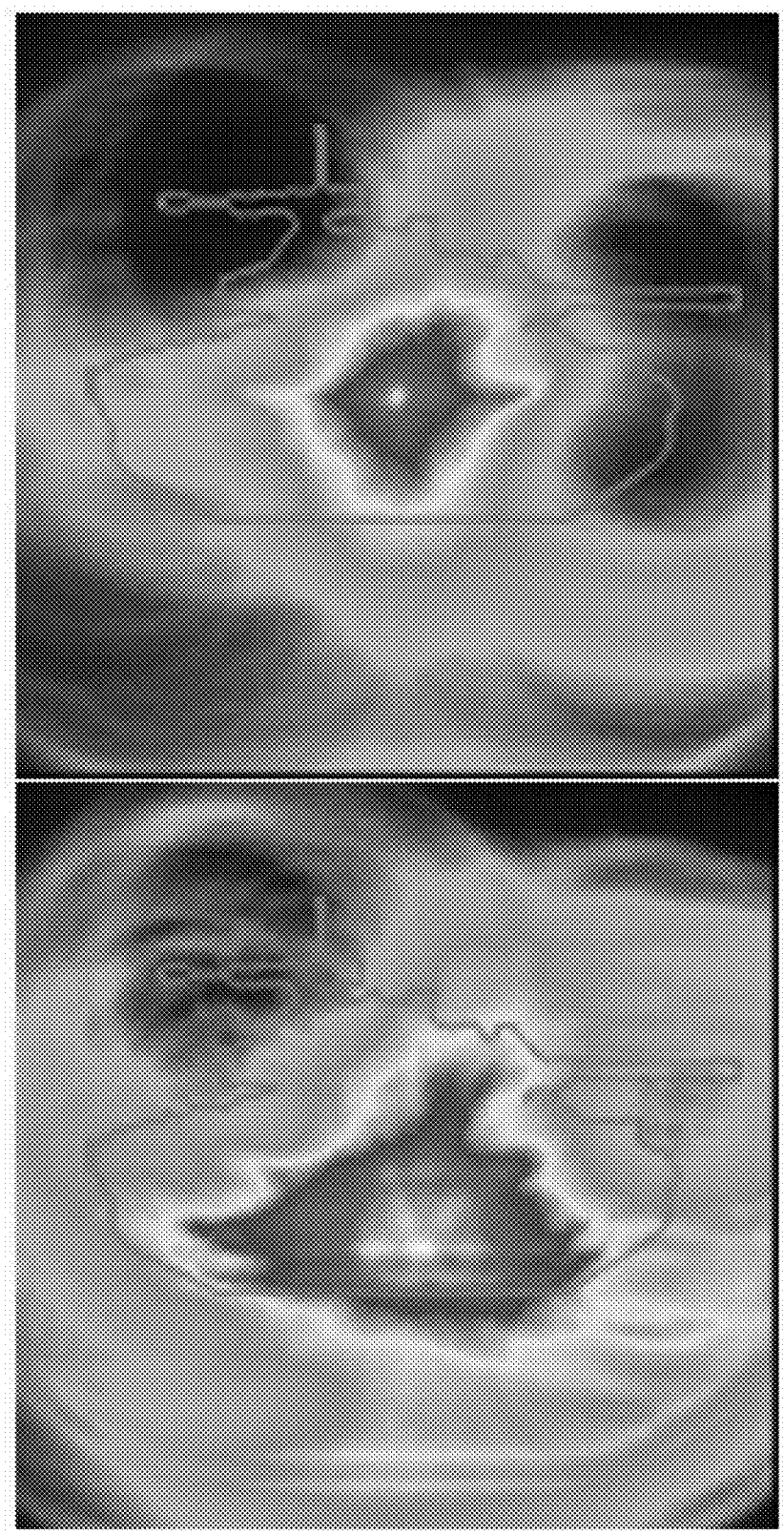
FIG. 8 show images including a pseudo-colored image on the top showing the accumulator array for a good match (actually, matching one image to a rotated and scaled version of itself). The image on the bottom shows the result of matching images of two different tanks.

The performance of the algorithm is particularly well demonstrated in FIG. 8.

The matching process is just a simple summation over all the points in the contour and is considerably sped up by storing $^2M(v)$ as a look-up table.

The process of finding the database entry which best matches a particular contour is then simply finding the match pair which produces the highest A.

Scale Estimation

Although scale is a global characteristic of a shape, estimation of scale can be easily determined in the absence of occlusion by simply normalization by the curve length or the distance between extrema.

Experimental Validation

Edges in Faces

A collection of 75 faces was chosen at random from a locally-collected database. These images contained some extraneous data, such as clothing, which were masked out using a simple segmentation strategy. Phase congruency is used for edge extraction from the images in the database. The maximum moment image map, extracted from each database image, is used as the initial edge indicator in this process.

To remove the aftershock effect of Phase Congruency in the Maximum Moments Image map, on step of cleaning was performed on the filtered version of the original Maximum Moments Image map. In this process, all the pixels having intensity less than 0.4 were converted to zero pixels. Shot-noise-like phenomena are filtered by removing all the isolated nonzero pixels in the following step. The resulting clean images were used as the representative shape contours of the corresponding database objects. The robustness and contract invariance of Phase Congruency, followed by a layer of filtration, produces a clear, easily distinguished contour even from a low contract poor quality image.

After identifying edges, those edges can be thinned to a single pixel.

A Measure for Image Security

The face images were rotated in twenty degree steps and each rotated image was compared with every other image. With no occlusion, the performance was perfect. Performance under partial occlusion, although not critical in the SAM application, demonstrates the power of the algorithm and is discussed below.

Figure 3:

It is interesting to consider the similarity between faces. Since, in the absence of occlusion, there were no errors, the error rate cannot be used to construct a confusion matrix; however, the match quality, the A of Equation 6, works quite well. The confusion matrix can be computed by averaging the match quality over all attempted matches, and the first 8 columns of an experiment with 19 faces is presented in Tables 1 and 2. Looking at the difference between the diagonal and off-diagonal matrices, it can be seen that the no-occlusion case has a higher average difference; a measure of signal-to-noise. It is noted that faces 2 and 4 (match quality 10 in Table 1) are the most similar of those which are not simply similarity transforms of the same face. These are shown in FIG. 3. By the same measure, faces 5 and 4 have a low similarity (6.2 in Table 1).

TABLE 1

Confusion matrix (first 8 columns) of matching
a face with all rotations of all other faces.
These faces are unoccluded. The highest possible value is 20.

| n | 1 | 2 | 3 | 4 | 5 | 6 | 7 | 8 |
|---|---|---|---|---|---|---|---|---|
| 1 | 17.2 | 7.2 | 7.2 | 8.0 | 6.5 | 7.5 | 7.2 | 8.0 |
| 2 | 8.2 | 16.0 | 8.5 | 10.0 | 8.2 | 8.8 | 8.5 | 8.2 |
| 3 | 7.5 | 7.0 | 17.0 | 7.8 | 8.0 | 7.0 | 7.0 | 7.0 |
| 4 | 7.5 | 7.5 | 7.8 | 16.8 | 6.8 | 7.0 | 7.2 | 7.8 |
| 5 | 5.2 | 7.0 | 6.5 | 6.2 | 16.2 | 6.8 | 5.5 | 6.5 |
| 6 | 7.2 | 7.8 | 8.5 | 7.5 | 7.5 | 17.0 | 7.2 | 7.8 |
| 7 | 6.8 | 7.0 | 7.0 | 6.2 | 6.0 | 7.0 | 17.0 | 7.5 |
| 8 | 7.8 | 6.5 | 7.5 | 7.5 | 7.2 | 8.5 | 7.8 | 16.8 |
| 9 | 7.8 | 7.2 | 8.8 | 8.2 | 7.0 | 7.8 | 7.2 | 7.5 |
| 10 | 7.0 | 6.8 | 6.8 | 7.2 | 6.8 | 7.2 | 7.0 | 7.0 |
| 11 | 8.0 | 6.2 | 7.0 | 7.8 | 6.5 | 8.0 | 7.0 | 6.8 |
| 12 | 6.0 | 6.2 | 8.2 | 6.8 | 6.8 | 6.5 | 6.2 | 7.2 |
| 13 | 7.2 | 7.0 | 7.2 | 7.8 | 7.2 | 8.2 | 7.5 | 7.0 |
| 14 | 6.5 | 6.2 | 6.5 | 7.0 | 6.0 | 6.0 | 6.2 | 7.5 |
| 15 | 5.8 | 7.2 | 6.5 | 7.2 | 5.8 | 6.2 | 5.5 | 6.2 |
| 16 | 7.2 | 7.5 | 7.2 | 7.8 | 7.0 | 9.2 | 7.5 | 7.8 |
| 17 | 6.0 | 6.2 | 6.5 | 6.2 | 4.5 | 6.0 | 6.5 | 7.0 |
| 18 | 7.0 | 7.8 | 7.2 | 7.0 | 6.8 | 7.8 | 6.8 | 6.8 |
| 19 | 6.0 | 6.2 | 7.0 | 7.5 | 6.8 | 6.8 | 6.8 | 7.2 |

Figure 4:
FIG. 4 shows images of two faces, face 5 on the left and face 4 on the right, which are identified by the algorithm as distinctively different.

They are shown in FIG. 4. It is observed that faces 2 and 4 both have similar facial expressions, and both have a mustache. Face 5 is female and quite different from face 4, both to the human observer and to the SKS algorithm.

Robustness to Occlusion

Figure 5:
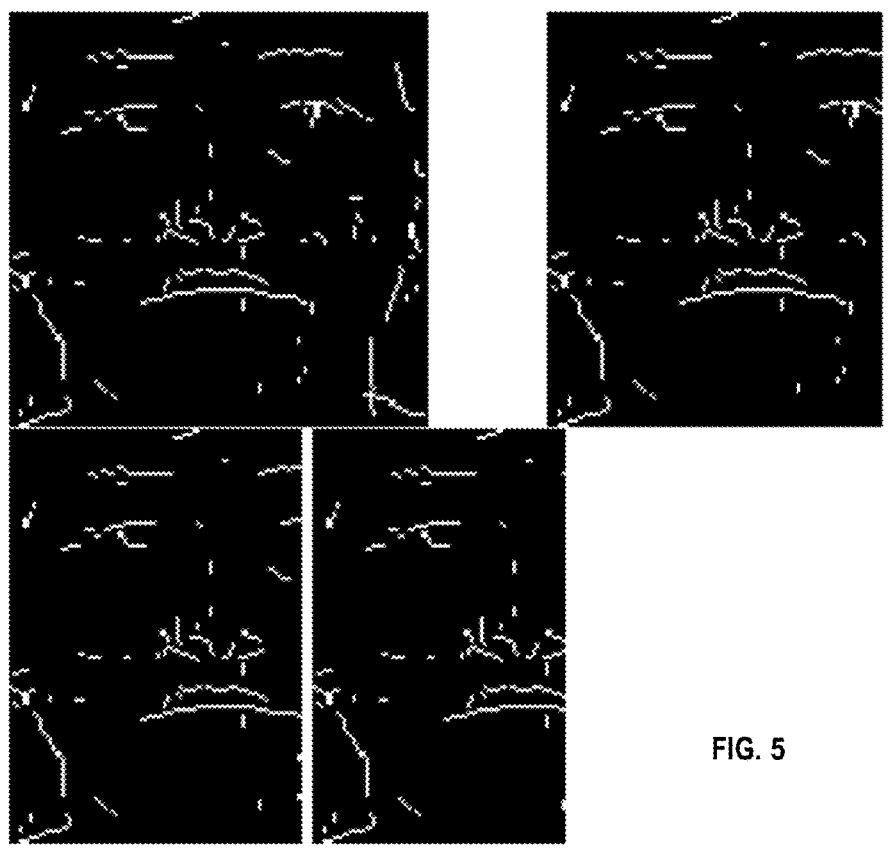
FIG. 5 shows images of occlusion of faces by removal of detail from the right side of the image, in amount of 0, 20, 30, and 40%.
Figure 6:
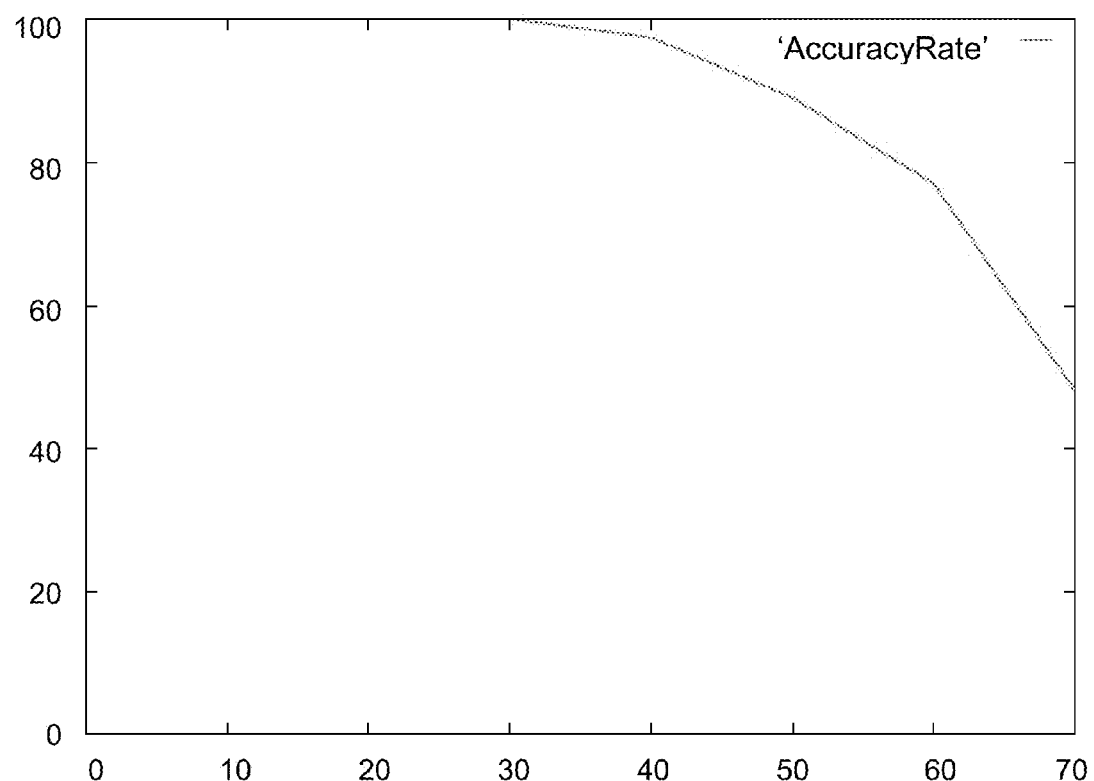
FIG. 6 is a graph showing performance of the SKS algorithm in recognizing partially occluded faces (images are rotated and occluded).

To evaluate robustness to occlusion, the faces in the database were subjected to similarity transforms and then occluded. All occlusions were accomplished by simply removing the appropriate number of columns on the right. FIG. 5 illustrates occlusion of 0, 20, 30, and 40%. It is important to emphasize that the occlusions always are from the right, but the face may be rotated in the frame, so either side, top, or bottom, may be occluded in any particular experiment. FIG. 6 illustrates the performance of the algorithm in classifying images as a function of percent occlusion. It is observed that errors start to occur at 40% occlusion. Random guessing can return correct answers at a rate of roughly 5%, so the accuracy shown of 48% at 70% occlusion is still surprisingly good, given such a high degree of occlusion.

TABLE 2

Confusion matrix (first 8 columns) of matching
a face with all rotations of all other faces.
Probes are occluded 30%.

| n  | 1    | 2    | 3    | 4    | 5    | 6    | 7    | 8    |
|----|------|------|------|------|------|------|------|------|
| 1  | 10.2 | 4.8  | 5.0  | 5.5  | 4.8  | 5.2  | 5.5  | 5.0  |
| 2  | 6.5  | 12.8 | 6.8  | 7.0  | 6.2  | 7.5  | 6.5  | 6.8  |
| 3  | 6.2  | 5.2  | 12.0 | 5.8  | 6.0  | 5.0  | 5.5  | 5.2  |
| 4  | 5.5  | 4.8  | 5.2  | 11.0 | 5.2  | 5.0  | 5.8  | 5.0  |
| 5  | 4.2  | 4.8  | 5.0  | 4.5  | 11.2 | 4.2  | 5.2  | 4.8  |
| 6  | 6.0  | 5.8  | 5.8  | 5.8  | 5.2  | 12.2 | 6.2  | 6.2  |
| 7  | 6.0  | 5.5  | 5.8  | 6.0  | 5.0  | 5.8  | 12.8 | 6.0  |
| 8  | 6.2  | 5.2  | 6.0  | 6.5  | 6.0  | 6.2  | 6.8  | 12.0 |
| 9  | 5.8  | 5.5  | 6.5  | 6.5  | 5.2  | 6.0  | 6.5  | 6.0  |
| 10 | 5.0  | 4.2  | 4.8  | 5.2  | 5.0  | 4.8  | 5.5  | 4.8  |
| 11 | 6.0  | 5.2  | 5.8  | 5.8  | 5.8  | 6.0  | 6.0  | 5.8  |
| 12 | 4.5  | 5.0  | 5.2  | 5.2  | 4.8  | 4.5  | 5.2  | 4.8  |
| 13 | 5.8  | 5.5  | 5.8  | 6.5  | 6.0  | 6.0  | 6.2  | 5.5  |
| 14 | 5.0  | 5.0  | 4.8  | 5.0  | 4.8  | 4.8  | 5.0  | 4.8  |
| 15 | 5.2  | 5.0  | 5.5  | 6.0  | 5.0  | 5.2  | 5.5  | 5.8  |
| 16 | 6.2  | 5.5  | 6.2  | 6.8  | 6.0  | 7.0  | 6.2  | 6.0  |
| 17 | 4.5  | 4.8  | 4.8  | 4.8  | 3.5  | 4.5  | 4.5  | 5.2  |
| 18 | 5.8  | 5.2  | 5.0  | 5.8  | 4.8  | 5.2  | 5.5  | 5.0  |
| 19 | 5.0  | 5.2  | 5.0  | 5.8  | 4.8  | 5.0  | 5.0  | 6.0  |

Figure 7:
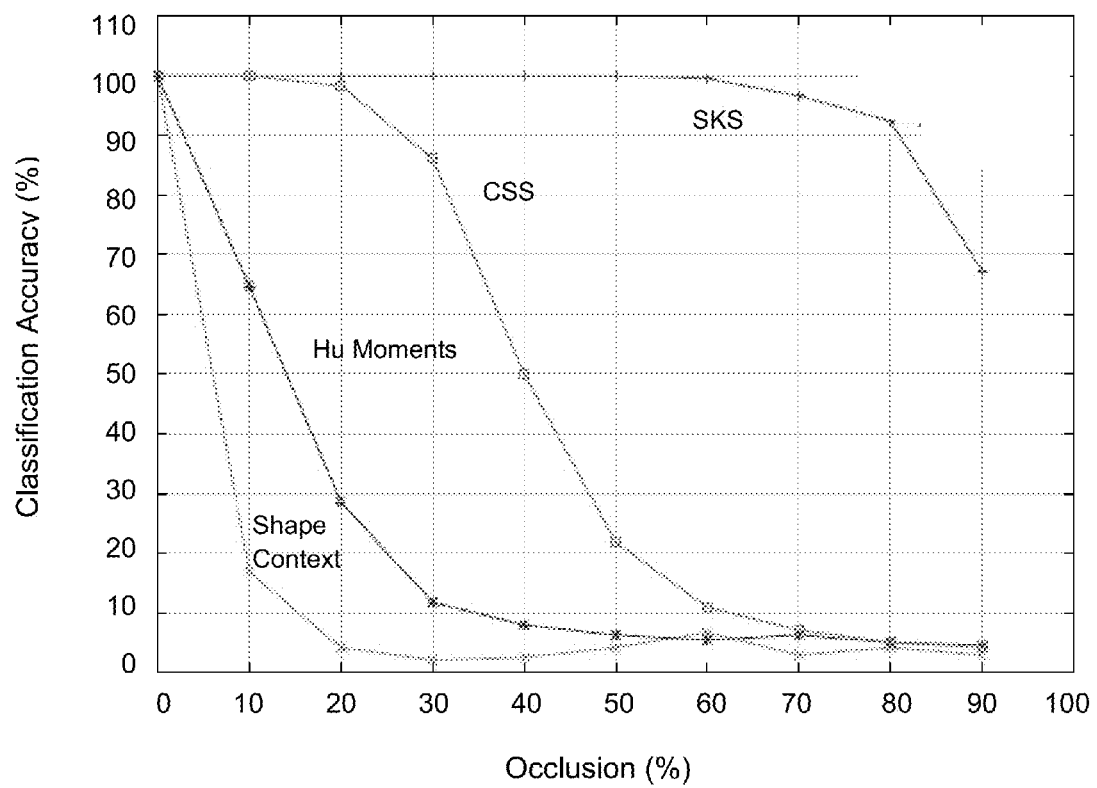
FIG. 7 is a graph showing performance of the SKS and other matching algorithms as a function of occlusion, when tested on a database of silhouettes with no internal detail.

This should be compared with the performance of the same algorithm on classifying simple silhouettes with no interior detail, included in FIG. 7 for ease of comparison. Classification accuracy on those images was robust up to sixty percent. It is clear from the graph that the discriminability of edge images of faces is not as good as that of boundaries of fish silhouettes. FIG. 7 may also be used to roughly predict the performance of other algorithms on this data set.

Fish

The method was tested with a large standard data set, the "SQUID" data set of 1100 fish silhouettes, and with a smaller database of 12 tank silhouettes. Surprisingly, the tank database proved to be the more challenging of the two, because the tanks contain so many straight lines, where curvature is zero. Results were compared with Curvature Scale Space Matching, the Shape Context, and a traditional minimum distance classifier using the Hu Invariant Moments as features.

In the tank experiment, models were built using all the tanks (rotated and scaled) and matched each tank contour with every model. The number of correct matches in the top 12 retrieved shapes was determined. Since there are 12 tanks and each tank 6 rotated and scaled versions of itself, the total number of correct matches is 1728.

Table 3 shows the retrieval results of the fours algorithms. The results show that the performance of both SKS and shape context are similar with both getting around 99% classification accuracy.

TABLE 3

Invariance to Similarity Transforms

| Algorithm | SKS | Shape Context | Hu Moments | CSS |
|---|---|---|---|---|
| Correct Retrievals (%) | 98.26 | 99.13 | 77.60 | 75.11 |

Robustness to Occlusion

Figure 9:
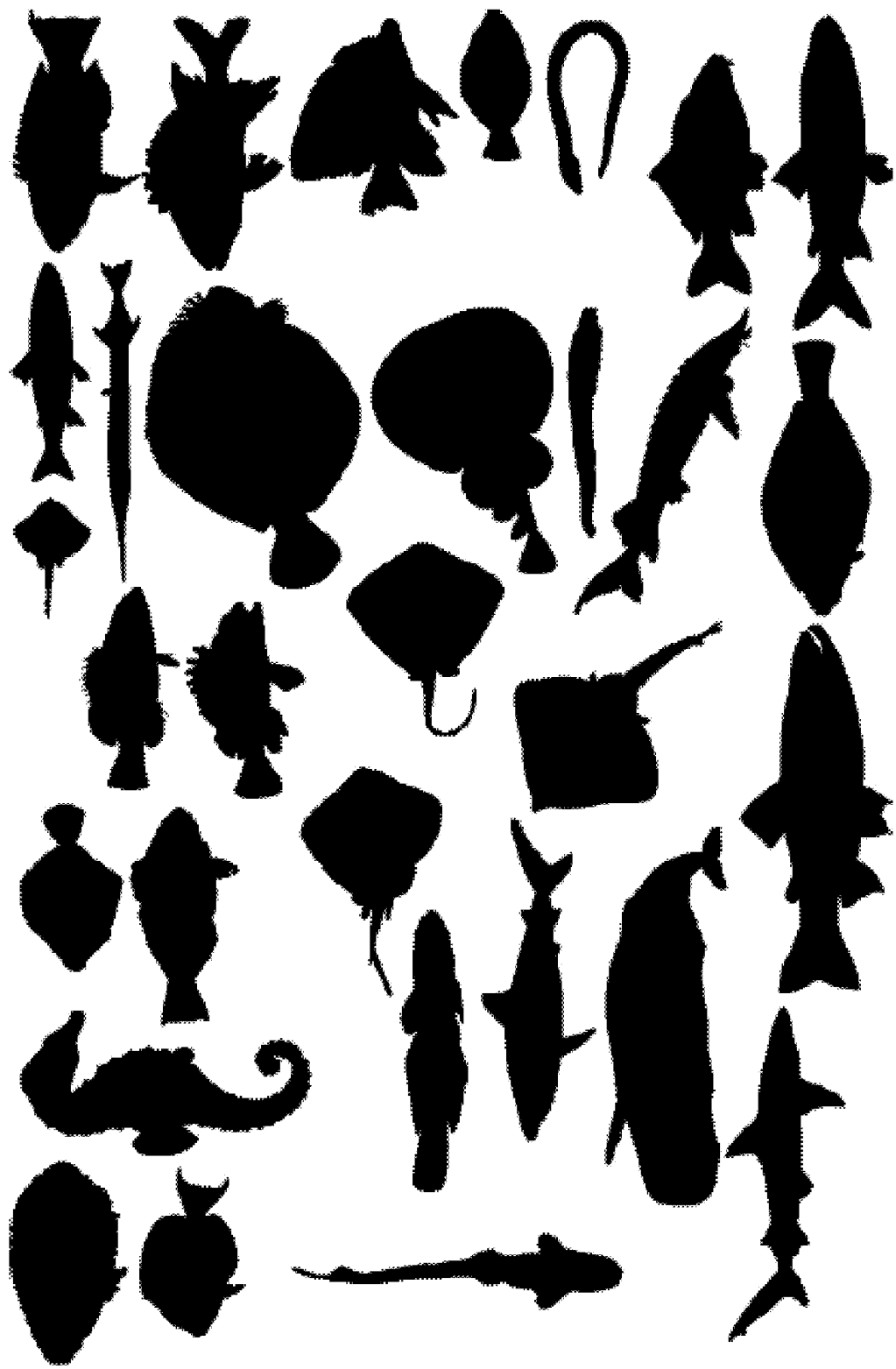
FIG. 9 shows 31 randomly picked silhouettes from the SQUID database.
Figure 10:
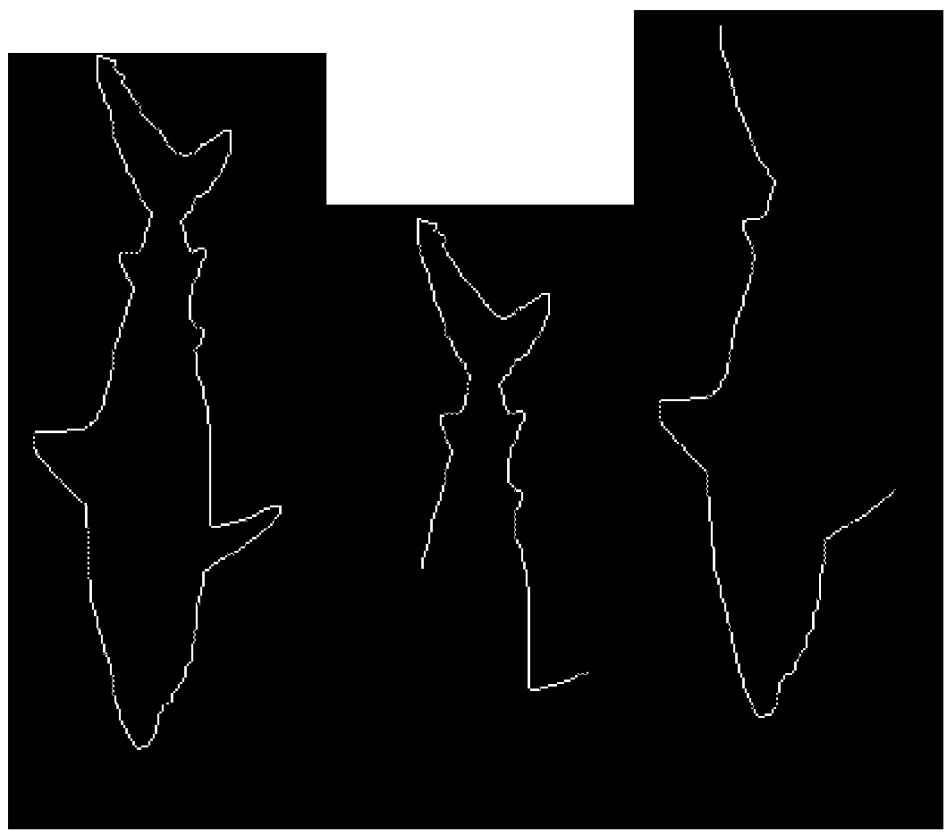
FIG. 10 shows a fish contour occluded by 40% with different occluded regions. The left is the original, the middle is the contour at the right.

In this experiment, 31 fishes were randomly picked from the SQUID database. These are shown in FIG. 9. Then, each fish was partially occluded by retaining 10-90% of the points. To determine a partial occlusion of say δ percent occlusion. Since it can be reasonably anticipated that some areas of the boundary will be more sensitive to occlusion than others, the starting point was moved from 1 to 2, then 3, etc. and more occluded boundaries were generated. An example of this is shown in FIG. 10. The performance reported is the average of all the occlusions of that particular boundary. At each occlusion level, the occluded fish generated using all possible starting points were matched with the unoccluded original set of 31 fish and classified. The results of the occlusion experiment for the four algorithms are shown in FIG. 7.

As it can be seen, the SKS algorithm significantly outperforms the others. Even at 60% occlusion, the classification is essentially perfect.

Figure 11:
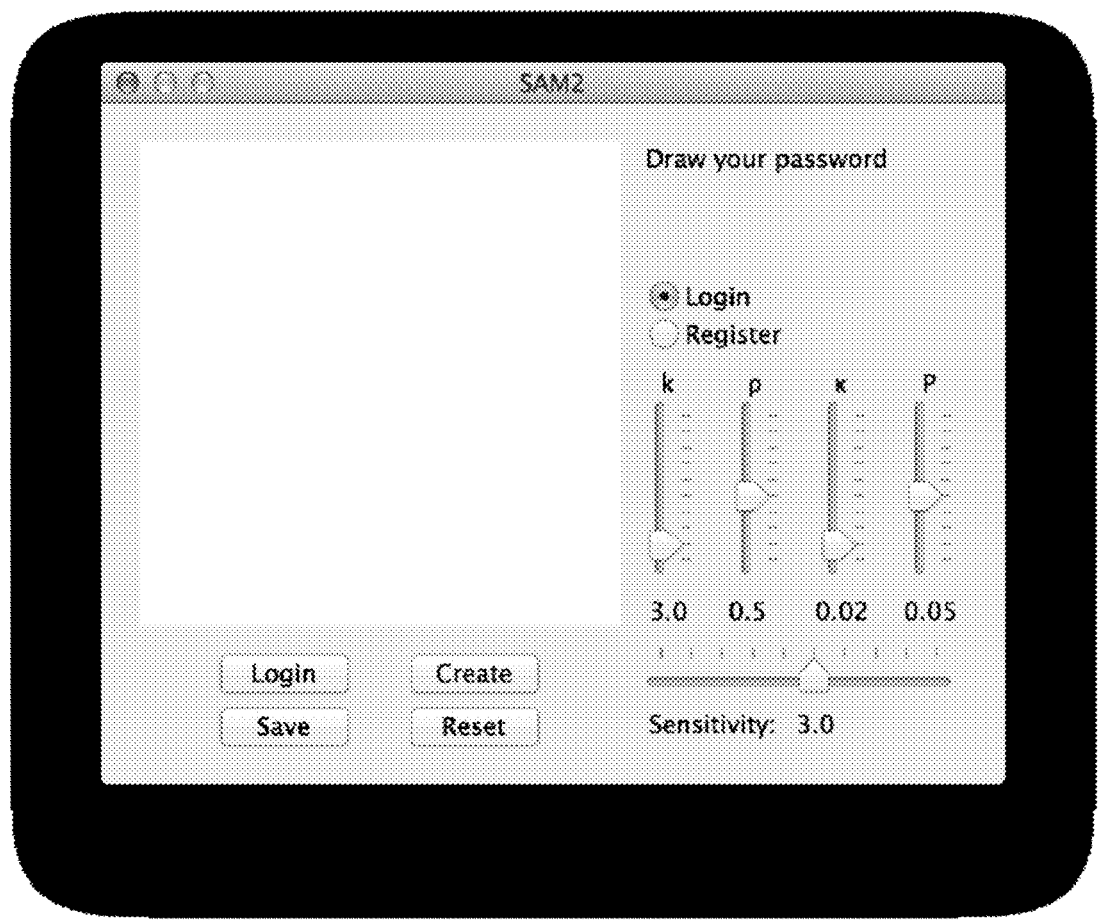
FIG. 11 depicts an image of a screen display of operator input according to embodiments.

FIG. 11 depicts an image of a screen display of operator input according to embodiments.

Figure 12:
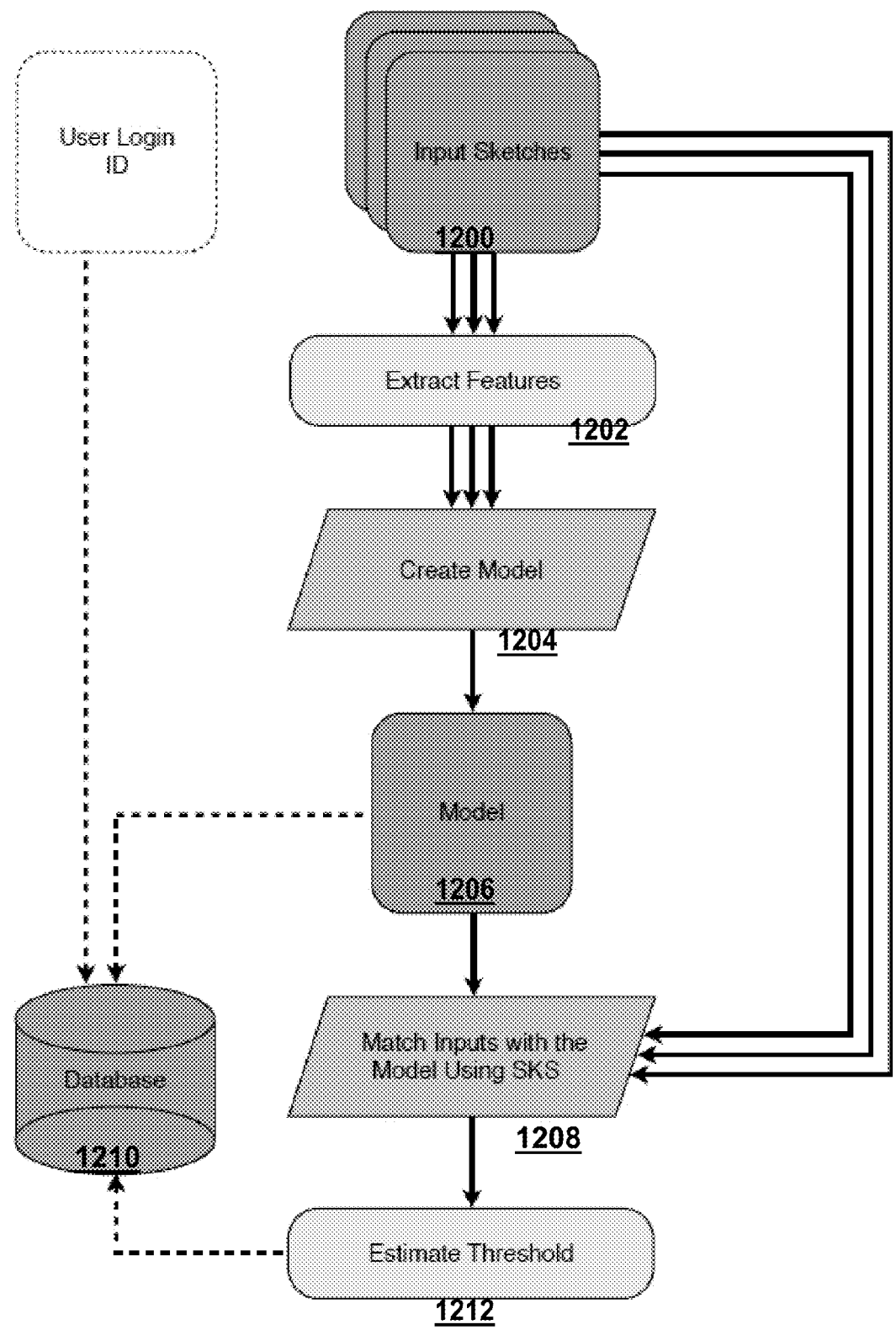
FIG. 12 is a flowchart showing an example training method according to embodiments.

FIG. 12 is a flowchart showing an example training method according to embodiments. The method may be implemented by, for example, the security manager 102 of FIG. 1, or any other suitable component(s) of a computing device. Referring to FIG. 12, the method includes generating input sketches (step 1200) of the same security picture. For example, a user may make gestures on a screen of a touchscreen display to draw several (e.g., 3) sketches of the same security picture. At step 1202, the security manager 102 may extract features from the drawn pictures. Based on the extracted features, the security manager 102 may create a model (step 1206) and store the model in a database 1210. At step 1208, the security manager 102 may match inputs with the model using SKS. At step 1212, a threshold may be estimated.

Figure 13:
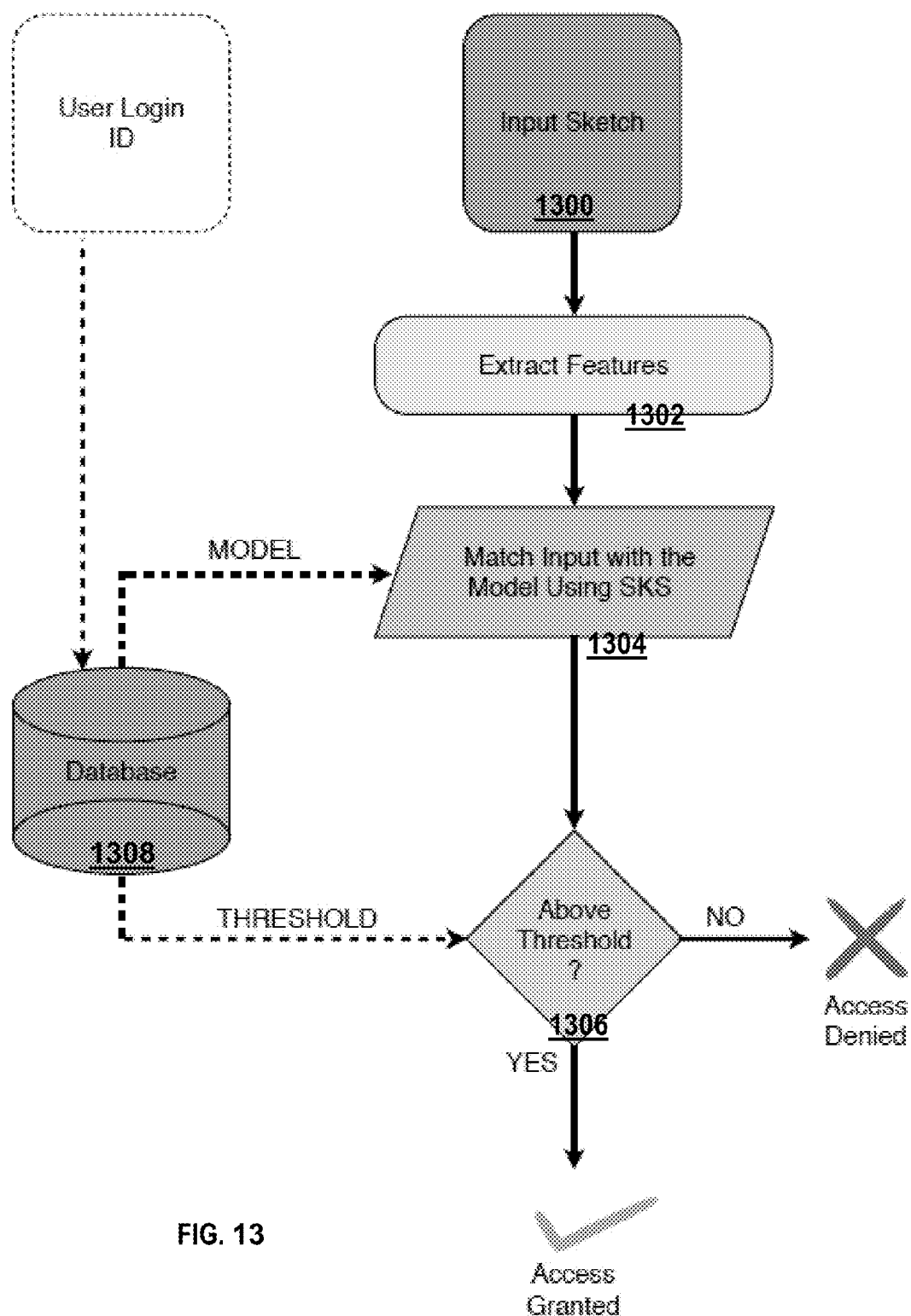
FIG. 13 is a flowchart showing an example login method according to embodiments.

FIG. 13 is a flowchart showing an example login method according to embodiments. The method may be implemented by, for example, the security manager 102 of FIG. 1, or any other suitable component(s) of a computing device. Referring to FIG. 13, the method includes inputting a sketch of a security picture (step 1300). At step 1302, the security manager 102 may extract features from the drawn security picture. At step 1304, the security manager 102 may match input of the drawn security picture with the model using SKS. The model may be accessed from the database 1308. At step 1306, the security manager 102 may determine whether characteristic levels match or are above a threshold. In response to determining that the characteristic levels are not above the threshold, access may be denied. In response to determining that the characteristic levels are above the threshold, access may be granted.

Figure 14:
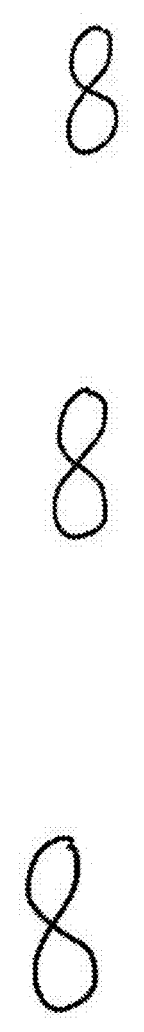

FIG. 14 illustrates a set of three training sketches input to the system which constitute the model.

Figure 15:
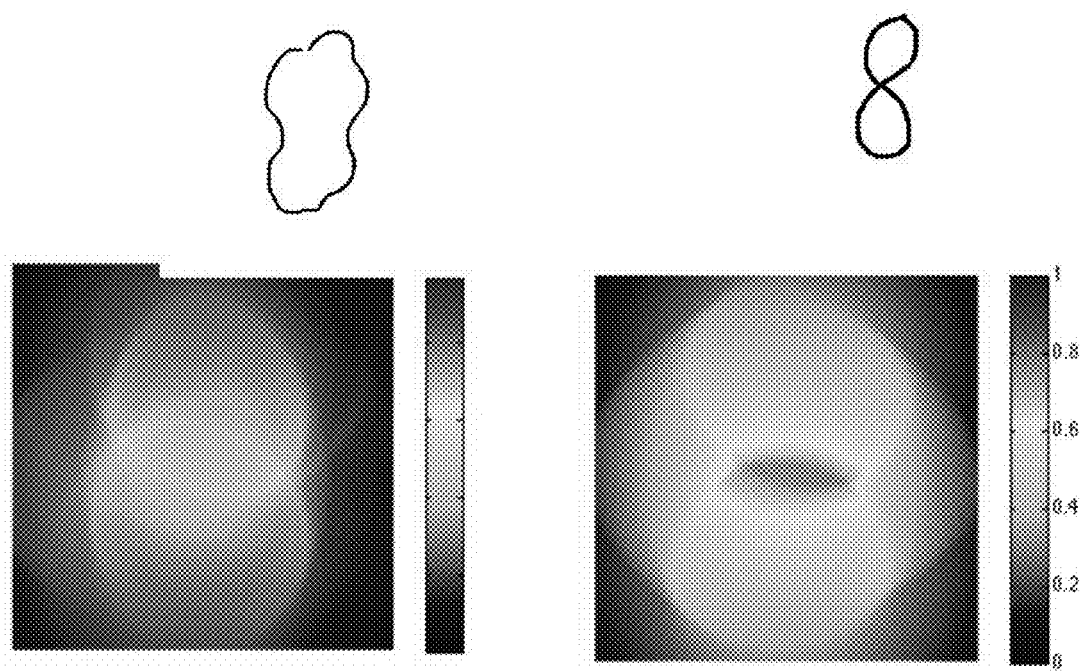
FIG. 15 illustrates a sketch input to the system which does not match the training sketch, and the accumulator formed, as well as the accumulator formed by a good match.

FIG. 15 illustrates a sketch input to the system which does not match the training sketch, and the accumulator formed, as well as the accumulator formed by a good match. Notice that the two accumulators are distinctly different in that the sketch corresponding to the correct match is sharply peaked.

CONCLUSION

These experiments demonstrate that there is a great deal of information in facial shape. Event without using color, texture, or shading, and without special classifiers tun ed from specific facial features, this holistic classifier provides good performance, especially for partially occluded images.

The SKS algorithm provides a strategy for matching shapes which has a remarkable degree of invariance to observer variations. Furthermore, it appears to be a strategy which is implementable by a biologically-plausible, highly parallel neural network. This may, in fact, be an actual model for how some aspects of shape recognition are done by the brain. For example, in investigations of shape recognition in region V4 of the visual cortex, it has been found that cells with responses that could be quantified by "Gaussian functions on a curvature x position domain," exactly as the SKS algorithm does. It has been shown that boundary curvature can be computed by a specialized neural network.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

REFERENCES

[1] Sadegh Abbasi. Squid database. http://www.ee.surrey.ac.uk/CVSSP/demos/css/demo.html. 1996.

[2] D. H Ballard. Generalizing the Hough Transform to Detect Arbitrary Shapes. *Pattern Recognition.* 13(2):111 122, 1981.

[3] S. Belongie and J. Malik. Matching with Shape Context. In *IEEE Workshop on Content-based Access of Image and Video Libraries (CBAIVL* 2000). 2000.

[4] S. Belongie. J. Malik, and J. Puzicha. Shape Matching and Object Recognition Using Shape Contexts. In *Technical Report UCB//CSDOO*—1128. UC Berkeley, January 2001.

[5] S. Belongie, J. Malik, and J. Puzicha. Shape Matching and Object Recognition Using Shape Contexts. *IEEE PAMI,* 24(4), April 2002.

[6] P. Chung, E. Chen, and J. Wu. A Spatiotemporal Neural Network for Recognizing Partially Occluded Objects. *IEEE Transactions on Signal Processing,* 46(6), July 1998.

[7] David Coeurjolly, Serge Miguet, and Laure Tougne. Discrete Curvature Based on Osculating Circle Estimation. *Lecture Notes in Computer Science,* 2059:303, 2001.

[8] David Coeurjolly and Stina Svensson. Estimation of Curvature Along Curves with Application to Fibres in 3D images of paper. *Lecture Notes in Computer Science,* 2749:247 254, 2003.

[9] I. Debled-Rennesson, J. P. Reveilles. A Linear Algorithm for Segmentation of Digital Curves. *International Journal of Pattern Recognition and Artificial Intelligence,* 9(4): 635 662, 1995.

[10] M. Fukumi. S. Omatu. and Y. Nishikawa. Rotation-Invariant Neural Pattern Recognition System Estimating a Rotation Angle. *Neural Networks. IEEE Transactions on,* 8(3), May 1997.

[11] P. V. C. Hough. Method and means for recognizing complex patterns. U.S. Pat. No. 3,069,654, 1962

[12] M. Hu. Visual pattern Recognition by Moment Invariants. *IRE Transactions on Information Theory,* 8, 1962.

[13] J. Kim, S. Yoon, and K. Sohn. A Robust Boundary-Based Object Recognition in Occlusion Environment by Hybrid Hopfield Neural Networks. *Pattern Recognition,* 29(12), December 1996.

[14] J. Kim, J. Choi, J. Yi, and M. Turk. Effective Representation Using ICA for Face Recognition Robust to Local Distortion and Partial Occlusion. *IEEE Transactions PAMI.* 27(12). December 2005.

What is claimed:

1. A computing device comprising:
   a touchscreen display or a pen and tablet, configured to receive gesture information comprising a plurality of points for a user drawn security picture for a user drawing a security picture on the touchscreen display or the tablet; and
   a security manager executed by at least one processor that is configured to:
      determine one or more characteristics associated with input of the gesture information including a curvature and a distance for the plurality of points for the user drawn security picture;
      select a single point to be a reference point for the curvature and distance information;
      model a curve for the user drawn security picture with respect to the selected reference point using a probabilistic distribution model function which provides a measure of likelihood that a random point along the curve has a curvature and is a distance from the selected reference point;
      compare the modeled curve for the user drawn security picture with a model of a pre-determined curve having been modeled by the model function; and
      authenticate the user based on the drawn security picture and the comparison of the modeled curve for the user drawn security picture and the modeled pre-determined curve.

2. The computing device of claim 1, wherein the determined one or more characteristics further include a time used for drawing one or more portions of the user drawn security picture.

3. The computing device of claim 1, wherein the security manager is configured to:
receive one or more input sketches of the security picture;
extract features from the one or more input sketches, where these features include not only features of the sketch itself, but also characteristics of how it was drawn;
create the modeled predetermined curve based on the extracted features;
match inputs with the modeled curve; and
estimate a threshold for the match.

4. The computing device of claim 1, wherein the security manager is configured to:
match the modeled pre-determined curve with the modeled curve;
determine whether a level associated with the characteristics is above a threshold;
grant access based on whether the level associated with the characteristics is above the threshold.

5. The computing device of claim 4, wherein the matching uses a Simple K-Space (SKS) algorithm.

6. The computing device of claim 1, wherein the touchscreen display or the tablet is configured to capture location of each point relative to the touchscreen display or the tablet, the time of every point of the sketch, and the drawing pressure of each point of the sketch.

7. The computing device of claim 1, wherein the security manager is configured to: estimate scale by normalizing the curve length or the distance between extrema of the curve.

8. The computing device of claim 1 wherein the model function which provides the measure of likelihood that a random point along the curve has a curvature and is a distance from the selected reference point is Gaussian distribution function.

9. The computing device of claim 1, wherein the model function is defined in a scalar form as:

$$M(\rho, \kappa) = \sum_j \exp\left(-\frac{(\rho - \rho_j)^2}{2\sigma_\rho^2}\right) \exp\left(-\frac{(\kappa - \kappa_j)^2}{2\sigma_\kappa^2}\right),$$

where $\rho_j$ is the distance from the selected reference point, $\kappa_j$ is the curvature at a selected point j on the curve, and $\sigma_\rho$ and $\sigma_\kappa$ are variance parameters for distance and curvature, respectively.

10. The computing device of claim 1, wherein the model function is defined in a vector form as:

$$M(\rho, \kappa) = \sum_j \exp\left(-\frac{(\rho - \rho_j)^2}{2\sigma_\rho^2}\right) \exp(-(v - v_j)^T K^{-1} (v - v_j)),$$

where K is a diagonal matrix of feature variances, $\rho_j$ is the distance from a selected point j on the curve, $\sigma_\rho$ is a variance parameter for distance, and v is a vector of the determined one or more characteristics associated with input of the gesture information.

11. The computing device of claim 10, wherein comparing comprises quantify the quality of a match of the modeled functions for the curves.

12. The computing device of claim 11, wherein the quantifying uses a function defined as:

$$A(x) = \frac{1}{L} \sum_{l=1}^{L} {}^2M(\|{}^1C_l - x\|, v_l)$$

where L is the number of points, $^1C$ is the modeled curve for the user drawn security picture, $^2M(\ )$ is the model function, $v_l$ is the vector for the $l^{th}$ point, and x is a given point.

13. The computing device of claim 1, wherein the predetermined curve corresponds to a known user's drawing of the security picture.

14. The computing device of claim 1, wherein the selected reference point is on the curve with high curvature.

15. The computing device of claim 1, wherein the determined one or more characteristics further include polar coordinates or rotation data for the points of the curve with respect to the selected reference point.

16. The computing device of claim 1, wherein the determined one or more characteristics further include the drawing pressure for points of the curve.

17. The computing device of claim 1, wherein the selected reference point is constrained to be one of the plurality of points for the user drawn security picture.

18. A method comprising:
using at least one processor and memory for:
receiving gesture information for drawing a security picture comprising a plurality of points for a user drawn security picture for a user drawing a security picture on a touchscreen display or a tablet;
determining one or more characteristics associated with input of the gesture information including a curvature and a distance for the plurality of points for the user drawn security picture;
selecting a single point to be a reference point for the curvature and distance information;
modeling a curve for the user drawn security picture with respect to the selected reference point using a probabilistic distribution model function which provides a measure of likelihood that a random point along the curve has a curvature and is a distance from the selected reference point;
comparing the modeled curve for the user drawn security picture with a model of a pre-determined curve having been modeled by the model function; and
authenticating the user based on the drawn security picture and the comparison of the modeled curve for the user drawn security picture and the modeled pre-determined curve.

19. The method of claim 18, wherein the determined one or more characteristics further include a time used for drawing one or more portions of the user drawn security picture.

20. The method of claim 18, further comprising:
receiving one or more input sketches of the security picture;
extracting features from the one or more input sketches and characteristics of how it was drawn;
creating the modeled predetermined curve based on the extracted features;
matching inputs with the modeled curve; and
estimating a threshold for the match.

21. The method of claim 18, further comprising:
matching the drawn security picture with the modeled predetermined curve;
determining whether a level associated with the characteristics is above a threshold;
granting access based on whether the level associated with the characteristics is above the threshold.

\* \* \* \* \*